(12) United States Patent
Plut

(10) Patent No.: US 9,785,215 B2
(45) Date of Patent: Oct. 10, 2017

(54) WHITE-BASED POWER SAVINGS

(75) Inventor: William J. Plut, Los Altos, CA (US)

(73) Assignee: Samsung Electronics Co., Ltd., Suwon-si (KR)

(*) Notice: Subject to any disclaimer, the term of this patent is extended or adjusted under 35 U.S.C. 154(b) by 719 days.

(21) Appl. No.: 12/839,395

(22) Filed: Jul. 19, 2010

(65) Prior Publication Data

US 2010/0277648 A1    Nov. 4, 2010

Related U.S. Application Data

(63) Continuation of application No. 11/121,698, filed on May 4, 2005, now Pat. No. 7,760,210.

(51) Int. Cl.
G06F 1/32 (2006.01)

(52) U.S. Cl.
CPC .......... G06F 1/3203 (2013.01); G06F 1/3265 (2013.01); *Y02B 60/1242* (2013.01)

(58) Field of Classification Search
CPC ...................................................... G09G 5/02
USPC ................. 345/82–83, 204, 211, 76, 77, 690
See application file for complete search history.

(56) References Cited

U.S. PATENT DOCUMENTS

| | | |
|---|---|---|
| 3,795,765 A | 3/1974 | DeGroat |
| 4,817,179 A | 3/1989 | Buck |
| 4,952,917 A | 8/1990 | Yabuuchi |
| 5,029,004 A | 7/1991 | Shibayama |
| 5,270,818 A | 12/1993 | Ottenstein |
| 5,359,345 A | 10/1994 | Hunter |
| 5,488,434 A | 1/1996 | Jung |
| 5,524,249 A | 6/1996 | Suboh |
| 5,572,655 A | 11/1996 | Tuljapurkar |
| 5,592,194 A | 1/1997 | Nishikawa |
| 5,598,565 A | 1/1997 | Reinhardt |
| 5,615,376 A | 3/1997 | Ranganathan |
| 5,619,707 A | 4/1997 | Suboh |
| 5,625,826 A | 4/1997 | Atkinson |
| 5,642,125 A * | 6/1997 | Silverstein ............ 345/87 |
| 5,675,364 A | 10/1997 | Stedman |
| 5,719,958 A | 2/1998 | Wober |
| 5,739,809 A * | 4/1998 | McLaughlin ....... G06F 3/04842 345/594 |

(Continued)

OTHER PUBLICATIONS

"Energy-adaptive Display Designs for Future Mobile Environments" Iyer et al. Proceeding of ModiSys 2003: The First International Conference on Mobile Systems, Applications, and Services, San Francisco, CA, May 2003.

(Continued)

*Primary Examiner* — Claire X Pappas
*Assistant Examiner* — Robert Stone
(74) *Attorney, Agent, or Firm* — Jefferson IP Law, LLP

(57) ABSTRACT

Described herein are power conservation techniques that reduce power consumption for an electronics device including a display. The techniques divide video information for display into white and non-white video information. The white video information is altered such that the alteration decreases the amount of power required to display the white video information. The altered white video information and non-white video information are then visually output together. White-based power conservation as described herein may be performed while a person uses the electronics device, which reduces power consumption continually during usage.

20 Claims, 9 Drawing Sheets

(56) References Cited

U.S. PATENT DOCUMENTS

| | | |
|---|---|---|
| 5,745,375 A | 4/1998 | Reinhardt |
| 5,781,768 A | 7/1998 | Jones, Jr. |
| 5,796,382 A | 8/1998 | Beetson |
| 5,796,391 A | 8/1998 | Chiu |
| 5,808,693 A | 9/1998 | Yamashita |
| 5,822,599 A | 10/1998 | Kidder et al. |
| 5,880,728 A | 3/1999 | Yamaashi et al. |
| 5,881,299 A | 3/1999 | Nomura et al. |
| 5,914,751 A | 6/1999 | Korth |
| 5,943,032 A | 8/1999 | Nagaoka |
| 5,956,014 A | 9/1999 | Kuriyama |
| 5,961,617 A | 10/1999 | Tsang |
| 5,991,883 A | 11/1999 | Atkinson |
| 6,026,179 A | 2/2000 | Brett |
| 6,029,249 A | 2/2000 | Atkinson |
| 6,031,914 A | 2/2000 | Tewfik |
| 6,043,853 A | 3/2000 | Shimazaki |
| 6,069,440 A | 5/2000 | Shimizu |
| 6,076,169 A | 6/2000 | Lee |
| 6,100,859 A | 8/2000 | Kuriyama |
| 6,104,362 A | 8/2000 | Kuriyama |
| 6,111,559 A | 8/2000 | Motomura |
| 6,144,440 A | 11/2000 | Osgood |
| 6,177,933 B1 | 1/2001 | Young |
| 6,177,946 B1 | 1/2001 | Sinclair |
| 6,232,937 B1 | 5/2001 | Jacobsen |
| 6,278,887 B1 | 8/2001 | Son |
| 6,285,344 B1* | 9/2001 | Everard ............... G06F 3/1475 345/213 |
| 6,297,601 B1 | 10/2001 | Kang |
| 6,323,880 B1 | 11/2001 | Yamada |
| 6,345,364 B1 | 2/2002 | Lee |
| 6,356,284 B1 | 3/2002 | Manduley |
| 6,362,835 B1 | 3/2002 | Urbanus |
| 6,366,291 B1 | 4/2002 | Taniguchi |
| 6,396,508 B1 | 5/2002 | Noecker |
| 6,396,520 B1 | 5/2002 | Ording |
| 6,408,293 B1 | 6/2002 | Aggarwal |
| 6,411,306 B1 | 6/2002 | Miller |
| 6,411,953 B1 | 6/2002 | Ganapathy |
| 6,414,675 B1 | 7/2002 | Shen |
| 6,452,610 B1 | 9/2002 | Reinhardt |
| 6,453,076 B1 | 9/2002 | Nakajima |
| 6,473,078 B1 | 10/2002 | Ikonen |
| 6,473,532 B1 | 10/2002 | Sheraizin |
| 6,496,165 B1 | 12/2002 | Ide |
| 6,529,212 B2 | 3/2003 | Miller |
| 6,552,736 B2 | 4/2003 | Honda |
| 6,587,087 B1 | 7/2003 | Ishizuka |
| 6,606,103 B1 | 8/2003 | Hamlet |
| 6,611,608 B1 | 8/2003 | Wu |
| 6,621,489 B2 | 9/2003 | Yanagisawa |
| 6,628,067 B2 | 9/2003 | Kobayashi |
| 6,657,634 B1 | 12/2003 | Sinclair |
| 6,661,029 B1 | 12/2003 | Duggal |
| 6,661,428 B1 | 12/2003 | Kim |
| 6,667,727 B1 | 12/2003 | Iwaoka |
| 6,677,924 B2 | 1/2004 | Nakayama |
| 6,677,936 B2 | 1/2004 | Jacobsen |
| 6,683,605 B1 | 1/2004 | Bi |
| 6,691,236 B1 | 2/2004 | Atkinson |
| 6,693,385 B2 | 2/2004 | Koyama |
| 6,701,263 B2 | 3/2004 | Jeong |
| 6,711,212 B2 | 3/2004 | Lin |
| 6,724,149 B2 | 4/2004 | Komiya |
| 6,724,151 B2 | 4/2004 | Yoo |
| 6,731,815 B1 | 5/2004 | Hu |
| 6,744,818 B2 | 6/2004 | Sheraizin |
| 6,762,741 B2 | 7/2004 | Weindorf |
| 6,768,520 B1 | 7/2004 | Rilly |
| 6,774,878 B2 | 8/2004 | Yoshida |
| 6,788,003 B2 | 9/2004 | Inukai |
| 6,788,822 B1 | 9/2004 | Zhang |
| 6,791,566 B1 | 9/2004 | Kuratomi |
| 6,801,811 B2 | 10/2004 | Ranganathan |
| 6,809,706 B2 | 10/2004 | Shimoda |
| 6,812,650 B2 | 11/2004 | Yasuda |
| 6,816,135 B2 | 11/2004 | Ide |
| 6,819,036 B2 | 11/2004 | Cok |
| 6,822,631 B1 | 11/2004 | Yatabe |
| 6,829,005 B2 | 12/2004 | Ferguson |
| 6,839,048 B2 | 1/2005 | Park |
| 6,850,214 B2 | 2/2005 | Nishitani |
| 6,900,798 B2 | 5/2005 | Heie |
| 6,912,664 B2 | 6/2005 | Ranganathan |
| 6,938,176 B1 | 8/2005 | Alben |
| 7,012,588 B2 | 3/2006 | Siwinski |
| 7,114,086 B2 | 9/2006 | Mizyuabu et al. |
| 7,301,522 B2 | 11/2007 | Ko |
| 7,389,432 B2 | 6/2008 | Chandley |
| 7,400,314 B1 | 7/2008 | Agano |
| 7,432,897 B2 | 10/2008 | Nishitani |
| 7,437,438 B2 | 10/2008 | Mogul |
| 7,460,103 B2 | 12/2008 | Konno |
| 7,463,235 B2 | 12/2008 | Hiyama |
| 7,505,034 B2 | 3/2009 | Nguyen |
| 7,580,031 B2 | 8/2009 | Plut |
| 7,580,033 B2 | 8/2009 | Plut |
| 7,583,260 B2 | 9/2009 | Plut |
| 7,602,388 B2 | 10/2009 | Plut |
| 7,602,408 B2 | 10/2009 | Plut |
| 7,629,971 B2 | 12/2009 | Plut |
| 7,663,597 B2 | 2/2010 | Plut |
| 7,714,831 B2 | 5/2010 | Plut |
| 7,760,210 B2 | 7/2010 | Plut |
| 7,786,988 B2 | 8/2010 | Plut |
| 2001/0032321 A1 | 10/2001 | Nanno et al. |
| 2002/0063671 A1 | 5/2002 | Knapp |
| 2002/0186214 A1* | 12/2002 | Siwinski ............. G09G 3/3208 345/212 |
| 2003/0071805 A1 | 4/2003 | Stanley |
| 2003/0080967 A1* | 5/2003 | Milch et al. ................. 345/589 |
| 2003/0135288 A1* | 7/2003 | Ranganathan ........ G06F 1/3203 700/22 |
| 2004/0091169 A1* | 5/2004 | Park et al. .................... 382/274 |
| 2004/0113875 A1* | 6/2004 | Miller ................. G09G 3/3216 345/82 |
| 2005/0052446 A1* | 3/2005 | Plut ............... 345/211 |
| 2005/0110717 A1* | 5/2005 | Iwamura ........................ 345/76 |
| 2005/0110740 A1* | 5/2005 | Linzmeier ........... G09G 3/3406 345/102 |
| 2005/0270265 A1* | 12/2005 | Plut ...................... G06F 1/3218 345/102 |
| 2005/0270283 A1* | 12/2005 | Plut ...................... G06F 1/3218 345/211 |
| 2006/0001659 A1* | 1/2006 | Plut ............... 345/211 |
| 2006/0001660 A1* | 1/2006 | Plut ............... 345/211 |
| 2006/0020906 A1 | 1/2006 | Plut |
| 2006/0071899 A1 | 4/2006 | Chang |
| 2006/0125745 A1 | 6/2006 | Evanicky |

OTHER PUBLICATIONS

"Energy-aware User Interfaces and Energy-adaptive Displays: Improving Battery Lifetimes in Mobile Devices" Geelhoed et al. Hardening Windows Systems 2000, System Experts 2001, Philip Cox et al.

* cited by examiner

WHITE-BASED POWER SAVINGS

This application is a continuation of and claims priority under U.S.C. §120 from co-pending U.S. patent application Ser. No. 11/121,698, filed May 4, 2005 and entitled, "WHITE-BASED POWER SAVINGS," which is incorporated herein by reference for all purposes.

FIELD OF THE INVENTION

This invention relates to systems and methods that reduce power consumed by an electronics device including a display. More particularly, the present invention relates to techniques for conserving power by reducing the amount of power consumed in displaying white video information.

BACKGROUND OF THE INVENTION

Video output consumes a significant-amount of power for a laptop or desktop computer. Other computing systems and electronics devices—such as handheld computing devices, cellular telephones and MP3 players—also devote a large fraction of their power budget to video. Power consumption sensitivity increases for portable devices that rely on a battery having limited energy supply.

Currently, commercially available power conservation techniques alter an entire image at once. Most techniques uniformly shut down a display or unvaryingly modify all video output in an image after some predetermined time. These techniques usually impede a person's ability to see graphics items and further use the computing device. Frequently, a person responds by reactivating the entire display—at full power. As a result, little power is saved.

Based on the foregoing, it should be apparent that alternative power conservation techniques would be desirable.

SUMMARY

The present invention provides power conservation techniques that reduce power consumption for an electronics device including a display. The techniques divide video information for display into white and non-white video information. The white video information is altered such that the alteration decreases the amount of power required to display the white video information. The altered white video information and non-white video information are then visually output together. White-based power conservation as described herein may be performed while a person uses the electronics device, which reduces power consumption continually during usage.

In one aspect, the present invention relates to a method for reducing power consumed by an electronics device that includes a display device. The method comprises identifying white video information included in video information for display on the display device. The method also comprises altering the white video information such that the display device will consume less power when displaying the altered white video information than an amount of power that would be required to display the white video information without the alteration. The method further comprises displaying the altered white video information with non-white video information included in the video information for display that was not identified as the white video information.

In another aspect, the present invention relates to a method for reducing power consumed by an electronics device. The method alters white video information according to a human visual processing mechanism. The altered white video information is represented according to an RGB scheme and the altered white video information comprises an altered red value, an altered blue value, an altered green value. The altered blue value is greater than the altered red value or the altered green value.

In yet another aspect, the present invention relates to a temporal method for reducing power consumed. The method comprises, after a predetermined threshold time, identifying white video information included in video information for display on the display device. The method also comprises altering the white video information after the predetermined threshold time and displaying the altered white video information with non-white video information included in the video information for display that was not identified as the white video information.

In still another aspect, the present invention relates to a system for reducing power consumed by an electronics device that includes a display device. The system comprises a separating apparatus designed or configured to separate video information for display on the display device into white video information and non-white video information. The system also comprises a power conservation apparatus designed or configured to a) alter the white video information such that the display device will consume less power when displaying the altered white video information than an amount mount of power that would be required to display the white video information without the alteration, and b) to output the altered white video information.

In another aspect, the present invention relates to a computer readable medium including instructions for reducing power consumed by an electronics device that includes a display device. The computer-readable medium comprises instructions for identifying white video information included in video information for display on the display device. The computer-readable medium also comprises instructions for altering the white video information such that the display device will consume less power. The computer-readable medium further comprises instructions for displaying the altered white video information with non-white video information included in the video information for display that was not identified as the white video information.

These and other features of the present invention will be presented in more detail in the following detailed description of the invention and the associated figures.

DESCRIPTION OF THE PREFERRED EMBODIMENTS

Figure 1A:
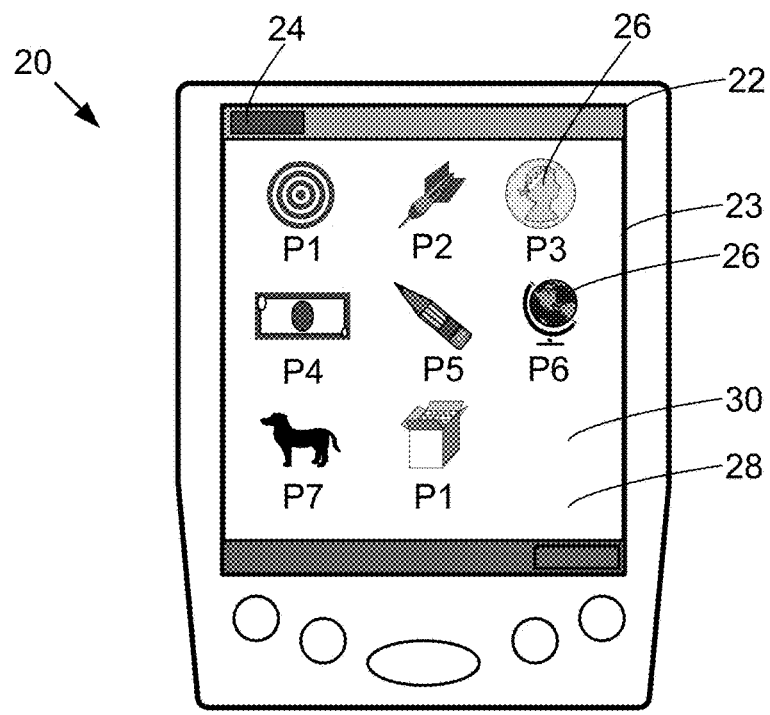
FIG. 1A illustrates a handheld computer device in accordance with one embodiment of the present invention.

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

For many display devices, white consumes more power than other shades and colors. To produce video information in many red/green/blue (RGB) based OLED devices, individual RGB optical modulation elements for each pixel receive commands that include RGB values between 0 and 255. For example, 'Full White' comprises red/green/blue values of 255-255-255 (on a scale from 0 to 255 with 255 being the highest for each color), respectively. The amount of power consumed for an individual light emitting diode or light filter commonly increases with each RGB color level between 0 and 255. Decreasing the RGB color levels for each pixel thus reduces power consumption for each pixel, and reduces power for the entire display device based on cumulative power reduction for all pixels.

White commonly represents the most common color on a computer display. For example, white areas in a word processing file, drawing program, or a file navigation menu may comprise more than half the area of a display. When a word processing file is displayed at full size for a display area, the white may cover over 80% of the display area.

The present invention reduces power consumption for displaying white video information. More specifically, the present invention reduces the amount of power consumed by a display device by altering white information in portions of an image. To do so, video information for visual output on the display device is separated into white and non-white video information. This involves defining what constitutes white. For example, a user or system designer may designate any video information greater than some threshold (e.g., video information having RGB values greater than 245 for each primary color) to be white. Alternatively, the white threshold may comprise a specific shade of white. After the definition of white has been established, video information for output on the display device is filtered according to the threshold, and video information identified as white is altered to reduce power consumption. The altered white video information is then displayed with non-white video information that did not pass the white threshold.

As the term is used herein, 'white video information' refers to video information that has passed some threshold or criteria of whiteness. One of skill in the art will understand that there are thousands of shades of white. The present invention advantageously permits a power conservation system designers and/or users to define a white threshold—and thus specify what information is altered for white power conservation.

Altering white video information to reduce power consumption may comprise reducing one or more RGB values for the white video information. This produces colors and shades that are 'off-white', or non-Full White. In one embodiment, the present invention alters the white video information based on power consumption characteristics of the display device. In another embodiment, the present invention alters the white video information according to a human visual processing mechanism. For example, white video information may be altered such that an increased proportion of blue is maintained in the altered white video information. As will be described below, an increased proportion of blue may increase the perception of whiteness according to human visual processing.

Altering white video information to reduce power consumption may substitute a 'replacement' shade of white (that consumes less power) for all white video information that passes the white threshold. Thus, a shade of white may be used as a 'replacement' white. For example, the following shades of white may be used as a replacement shade of white and/or a white threshold to filter white video information: Snow White (255-250-250), Ghost White (248-248-255), Floral White (255-250-240), White Smoke (245-245-245), Old Lace (253-245-230), Linen (250-240-230), Papaya White (255-239-213), Antique White (250-235-215), Blanche Almond White (255-235-205), Bisque White (255-228-196), Moccasin White (255-228-181), GainsBoro White (220-220-220), PeachPuff White (255-218-185) and Navajo White (255-222-173).

Specific RGB values may thus act as a white threshold. For example, if a user designates White Smoke (245-245-245) as the white threshold and replacement white for all white video information on the display, any video information having RGB values greater than (245-245-245) for each of the three primary colors is converted to (245-245-245). For an OLED device for example, this reduces power consumed for all pixels displaying the altered white information according to the reduction in power for each RGB pixel color element. Cumulatively, this reduces power consumption for an entire display area according to the amount of white information displayed by pixels in the display area and the amount of individual RGB reduction for each pixel.

The present invention finds use with portable electronics devices powered by a battery. Since video power consumption largely influences overall power usage for many portable devices, power conservation as described herein extends operational longevity for the device when running on a battery, or other limited source of energy.

Figure 1B:
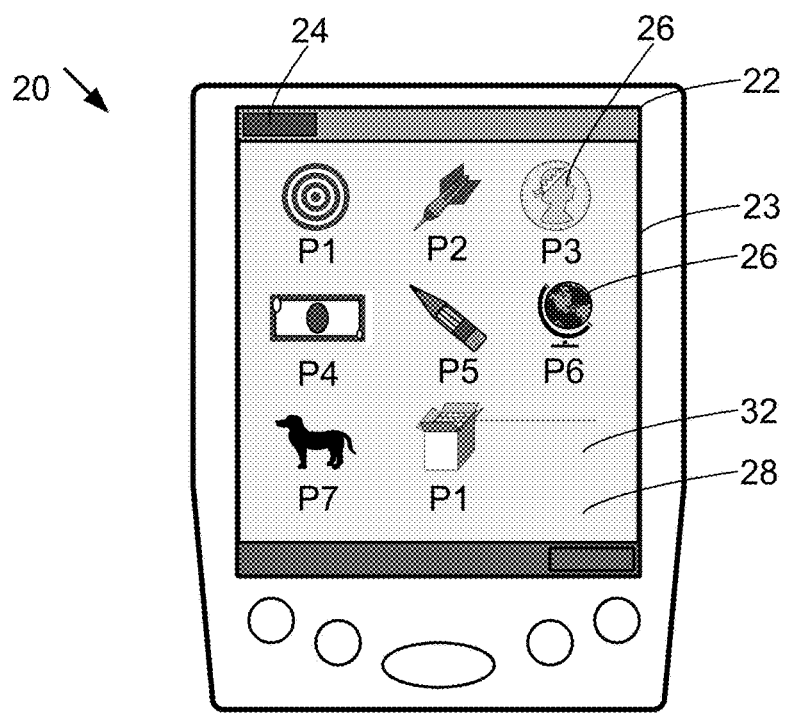
FIG. 1B illustrates the handheld device of FIG. 1A after white video information alteration in accordance with a specific embodiment of the present invention.

FIG. 1A illustrates a handheld computer device 20 in accordance with one embodiment of the present invention. FIG. 1B illustrates handheld device 20 after white video information alteration in accordance with a specific embodiment of the present invention. While the present invention will now be described as video information, graphics components and hardware components, those skilled in the art will recognize that the subsequent description with respect to FIGS. 1A-1F may also illustrate methods and discrete actions for reducing power consumption for a display device and associated electronics device.

Handheld computer device 20 includes a display device 22. Display device 22 outputs video information. Individual pixel locations within a display area 22 permit allocation and addressing of video information displayed on display area 23. Pixel dimensions and resolution may characterize display area 23. For example, display device 22 may comprise an OLED display that offers pixel dimensions of 480×640.

The video information refers to data for display to produce a visual representation of some form. The video information data is typically stored in a logical manner using values assigned to pixel locations, according to a pixel arrangement used for storing the data. Exemplary color schemes suitable for assigning values to video information are described below. The pixel arrangement may include a resolution that may or may not match a resolution for display device 22. For example; picture video information may be stored as a bitmap of a certain resolution for output on display device 22.

The computer runs a graphics-based user interface 24 within display area 23. Interface 24 facilitates interaction between a user and device 20 and/or between the user and one or more programs run on computer device 20. To do so, interface 24 outputs video information on display device 20. As shown, interface 24 currently displays a background 28 and a set of icons 26 that each correspond to a program available on device 20. The icons 26 are displayed on background 28, which includes its own set of background video information and provides a backdrop environment for graphics-based user interface 24.

Video information output on display device 22 includes white video information 30. The present invention decreases power consumption for white video information 30 when output on display device 22. More specifically, the present invention alters white video information 30 such that display device 22 requires less power when outputting the altered white video information 32 (FIG. 1B) than an amount of power required without the alteration. In one embodiment, all white video information 30 for display upon display device 22 is altered to reduce power consumption. Since the video information within display device 22 may include a significant amount of white, this may conserve an appreciable amount of power for display device 22 and electronics device 20. For example, background 28 may comprise over 60% of the video information within display area 23. When background 28 mainly constitutes white video information, the present invention may significantly conserve power and extend battery life.

In another embodiment, logic is applied to selectively alter certain white video information. For example, all white information within background 28 may be altered, while any white video information included in icons 26, control menus and toggles, a clock, and frequently displayed and selected graphics components may not be altered.

One program run on electronics device 20 may correspond to a word processing program. During usage, the word processing program may dominate display area 23 such that the majority of video information output by display device 22 includes white video information in a word processing window. For example, the white video information 30 may constitute 80% of the video information output by the word processing program at any one time. With a decrease from Full White (255-255-255) to White Smoke (RGB: 245-245-245, HSL: 136/249/233), this may correspond to about a 4-5% reduction in power for an OLED device (the actual amount will depend on what video information is displayed in the other 20% of video information and other factors such as RGB power costs for device 22). With a decrease from Full White (255-255-255) to Antique White (250-235-215), this may correspond to about a 7-8% reduction in power. In both cases, power reduction conservation occurs as long as the person uses the word processing program, or any other program with significant altered white video information 32.

In one embodiment, white video information is altered immediately and maintains its altered state. In this case, the present invention conserves power immediately and continually (as opposed to after some predetermined inactivity time). Graphics-based user interface 24 may also shut down the entire display device 22 after some predetermined time of inactivity to further increase power conservation. However, white power conservation of the present invention has conserved significant power in the meantime.

It is also important to note that the present invention conserves power without substantially compromising usability of electronics device 20. More specifically, the white video information is altered such that the person may still detect video information included in graphics-based user interface 24 and display area 23. Thus, a user may still detect the position of each icon 26 and visual information relevant for individual icon detection when the background white information is altered (unless the icon is the same color as the altered white, which is highly unlikely). Similarly, a user may still read text included in the word processing program (e.g., black letters) while white information in the program is altered.

While FIGS. 1A and 1B illustrate a handheld computer 20, power conservation techniques described herein are also well suited for use with a cellular telephones, portable music players, digital cameras, and other portable computing and electronics devices.

Figure 1C:
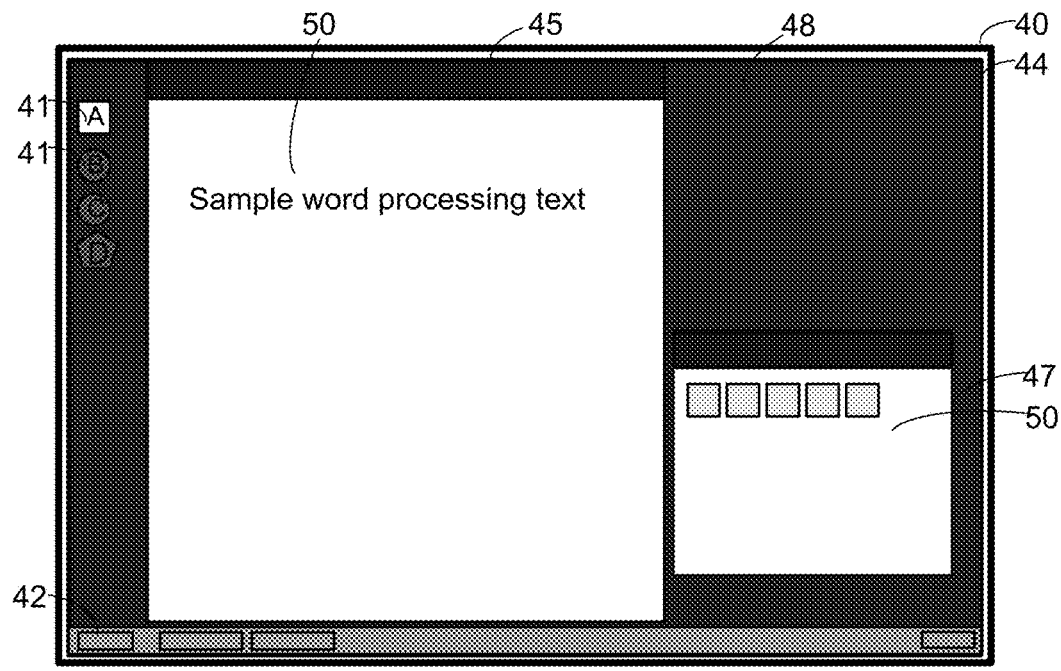
FIG. 1C illustrates a display device for use with a laptop computer or desktop computer in accordance with one embodiment of the present invention.
Figure 1D:
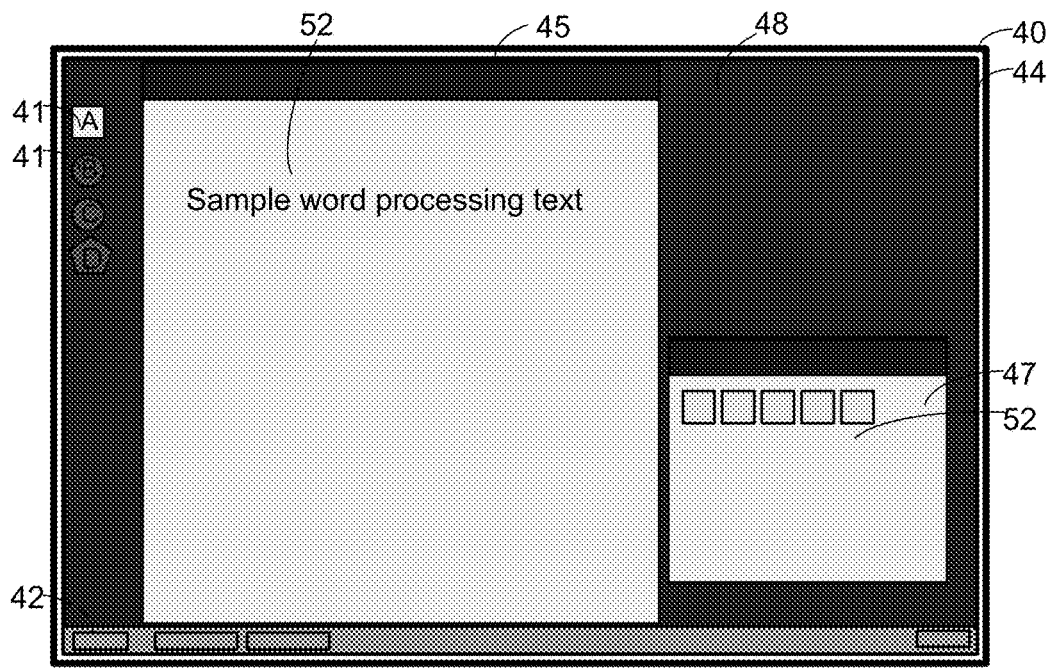
FIG. 1D illustrates the display device of FIG. 1C after white video information alteration in accordance with a specific embodiment of the present invention.

The present invention also finds use with larger display devices and electronics devices. For example, desktop and laptop computers with 15-17" display areas, measured diagonally, are now common. Some programs, such as word processing and drawing programs, often occupy more than 60% of the display area and predominantly include white video information. FIG. 1C illustrates a display device 40 for a laptop computer or desktop computer in accordance with one embodiment of the present invention. FIG. 1D illustrates the display device 40 after white video information alteration in accordance with a specific embodiment of the present invention.

Display device 40 outputs video information for the laptop computer within a display area 44. A graphics-based user interface 42 facilitates interaction between a user and the laptop computer and/or between the user and one or more programs run on the laptop computer. Interface 42 currently outputs video information for graphics components 45 and 47, icons 41 and background 48. Graphics components 41, 45 and 47 are each for display as discrete visual objects and include video information related to a program stored and/or run on the computer. Common programs include word processing programs, file navigation displays, Internet Browsers, drawing programs, music player programs, and video games, for example. Each program may include its own video information. For example, graphics components 45 and 47 may each include their own bitmap comprising an array of pixel values designated by pixel location for display device 40.

For the illustrative example shown in FIG. 1C, graphics component 45 comprises video information for a word processing program. Graphics component 47 comprises video information for a file navigation program. Background 48 represents a backdrop graphics component for the graphics-based user interface 44 and comprises background video information that does not include white video information (e.g., it is a solid blue shade). Picture files used in a background commonly comprise video information stored as a bitmap, which comprises an array of luma and/or chroma values for each pixel in the stored image. Color bitmaps may be stored as ".BMP" files using pixel depths such as 8, 16, 24, and 32 bits. Other graphics formats, such as GIF, JPEG, and others, can also be used to store a background image. In one embodiment, white video information in a picture file used in a background is altered to reduce power. In another embodiment, a user or power conservation designed does not alter white video information in a picture file used in a background. Similar to the handheld device described above, a white background may be altered in its entirety.

Video information output on display device 40 includes white video information 50. The present invention decreases power consumption for white video information 50. More specifically, the present invention alters white video information 50 such that display device 40 requires less power when outputting the altered white video information 52 (FIG. 1D). In one embodiment, the present invention alters all white video information in display area 44 to conserves power (FIG. 1D). For example, the white video information 50 may be altered from Full White (255-255-255) to a shade of Ghost Smoke (RGB: 232-232-255, HSL: 160/240/229) that favors blue.

In another embodiment, the power conservation techniques separate graphics component 45 and 47 (and/or the background) based on user activity in one of the to graphics components (and/or the background). In this case, white video information is altered for whichever graphics components are inactive. For example, based on user activity in the background, white video information 50 in the word processing program for graphics component 45 and in the file navigation program of graphics component 47 may be altered (as shown). Alternatively, based on user activity in graphics component 45, white video information 50 in the word processing program and background may be altered.

Having discussed two exemplary electronics devices and display devices, white video information alteration and power conservation will now be described in further detail.

Red, green, blue (RGB) color schemes are popular and suitable to characterize video information according to combinations of red, green and blue values. Video information is often stored according to an RGB scheme. In many RGB based display devices, individual optical modulation elements receive commands for video output that include RGB values between 0 and 255 to produce a desired video output for a pixel. For example, one greenish color may comprise red/green/blue values of 45/251/62.

For an OLED display 22 included in handheld computer 20, the amount of current sent to an individual light emitting diode or filter increases with each color level between 0 and 255. Decreasing the color levels for each RGB diode then reduces the amount of power for each pixel. More specifically, altering white video information RGB values of 240/245/227 to 235/235/235 reduces the amount of current sent to each individual light emitting diode for each pixel. The amount of power conserved for an OLED display device can then be determined by summing the power saved for all pixels in the display area that have been altered.

Figure 2A:
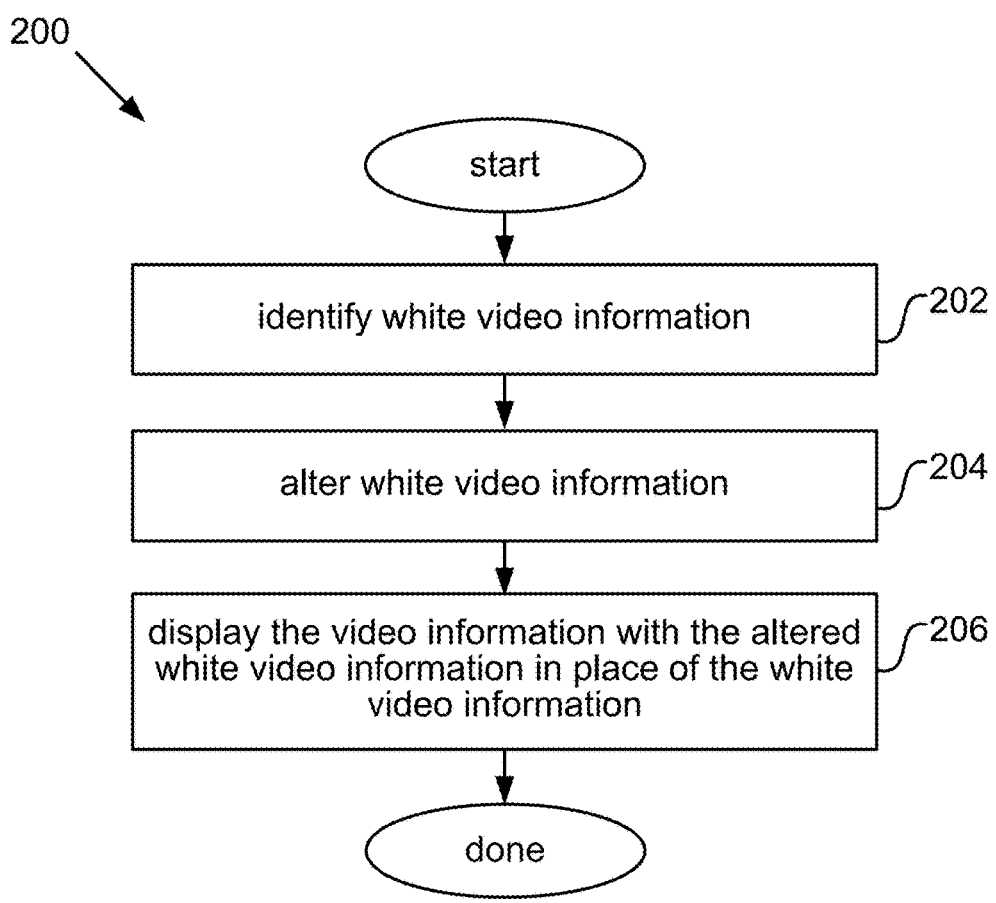
FIG. 2A illustrates a process flow for reducing power consumed by a display device in accordance with one embodiment of the invention.

FIG. 2A illustrates a process flow 200 for reducing power consumed by a display device in accordance with one embodiment of the invention. While the present invention will now be described as a method and separable actions for reducing power consumption, those skilled in the art will recognize that the subsequent description may also illustrate hardware and/or software systems and components capable of performing the method and actions.

Process flow 200 begins by identifying white video information included in video information for display on a display device (202). In one embodiment, identifying the white video information comprises applying a white threshold to the video information. The white threshold refers to a definition of whiteness and sets a bar or criteria for determining whiteness and separating video information for display into white video information and non-white video information. If video information for display meets the criteria, it is labeled as white video information and separated or designated for alteration. Video information that does not pass the threshold is labeled as non-white.

The present invention allows a designer and/or user to set and control the white threshold. In one embodiment, the white threshold corresponds to a particular shade of white. One of skill in the art will appreciate that there are thousands of shades of white. There are bluish whites, more or less yellowish whites, more or less grayish whites and so on. Several exemplary shades of white suitable for use as a white threshold were listed above. The present invention is not limited to any shade of white or RGB combination as a white threshold.

A designer or user may also set specific RGB (or another suitable color representation scheme) values to achieve a particular white threshold. In one embodiment, the video information is represented according to an RGB scheme and the white threshold comprises meeting a red threshold, a blue threshold, and a green threshold. The red threshold, the blue threshold, and the green threshold may be different. In a specific embodiment, the red threshold comprises a red value greater than 220. A green threshold comprising a green value greater than 220 is suitable in many instances. In a specific embodiment, the blue threshold comprises a blue value greater than 220. Other individual red, green and blue thresholds above and below these levels may be used. The present invention permits a power conservation system designer and/or user to tailor the white threshold—and thus specify what information is altered for white power conservation and affect how much power is conserved. In another specific embodiment, the white video information is represented according to an HSL scheme and the white threshold comprises a luminance threshold The white video information is then altered (204) such that the display device will consume less power when displaying the altered white video information than an amount of power that would be required to display the white video information without the alteration. This typically generates 'off-white', or non-Full White, colors and shades.

The white video information may be altered in any manner that reduces power consumption for the display device. In one embodiment, altering the white video information replaces the white video information with a replacement white. For example, the replacement white may include a predetermined shade of white. Several exemplary shades of white suitable for use as a replacement white were described above. Each of the off-white shades provided above may also be further adapted in one or more of their RGB values to provide a customized shade of white. Replacement whites are not limited to the specific shades describe above and may include RGB combinations of any suitable whitish color or shade.

The altered white video information may also be represented according to an RGB scheme where the altered white video information comprises an altered red value, an altered blue value, and an altered green value. Alteration may then include any mathematical or logical operation on the RGB values for the white video information. Altering white video information to reduce power consumption may comprise reducing one or more RGB values for the white video information. For example, subtracting a scalar quantity from each RGB value may reduce RGB values for the white video information. Alternatively, multiplying each RGB value by a number less than one (e.g., by 0.9) may reduce RGB values for the white video information. Furthermore, each RGB value may be reduced to a predetermined altered RGB value according to a specific shade of white determined by a designer or user. In a specific embodiment, the altered red value, the altered blue value, and the altered green value are different. For example, the altered red value may be less than 240, the altered blue value may be greater than 230, and the altered green value may be less than 240. Other RGB levels are suitable for a replacement white.

RGB levels for the white threshold may not be the same as RGB levels for the altered white video information. For example, the white threshold may include one or more RGB values that are greater than RGB values for a replacement white.

After alteration of the white video information, the altered white video information is simultaneously displayed with the unaltered non-white video information (206).

In one embodiment, the present invention alters white video information according to a human visual processing mechanism. More specifically, the present invention leverages one or more characteristics of human visual processing to decrease power consumption in a display device. Human vision employs a number of biochemical mechanisms that convert light into a biochemical signal. Generally, human perception of visual information such as color is a combination of the physical composition of a light beam (spectral composition, intensity, etc.), the physiological processes in the human eye, physiological processes in the optic nerves as a consequence of light stimulus in the eye, and processing of these stimuli in the brain.

Figure 1E:
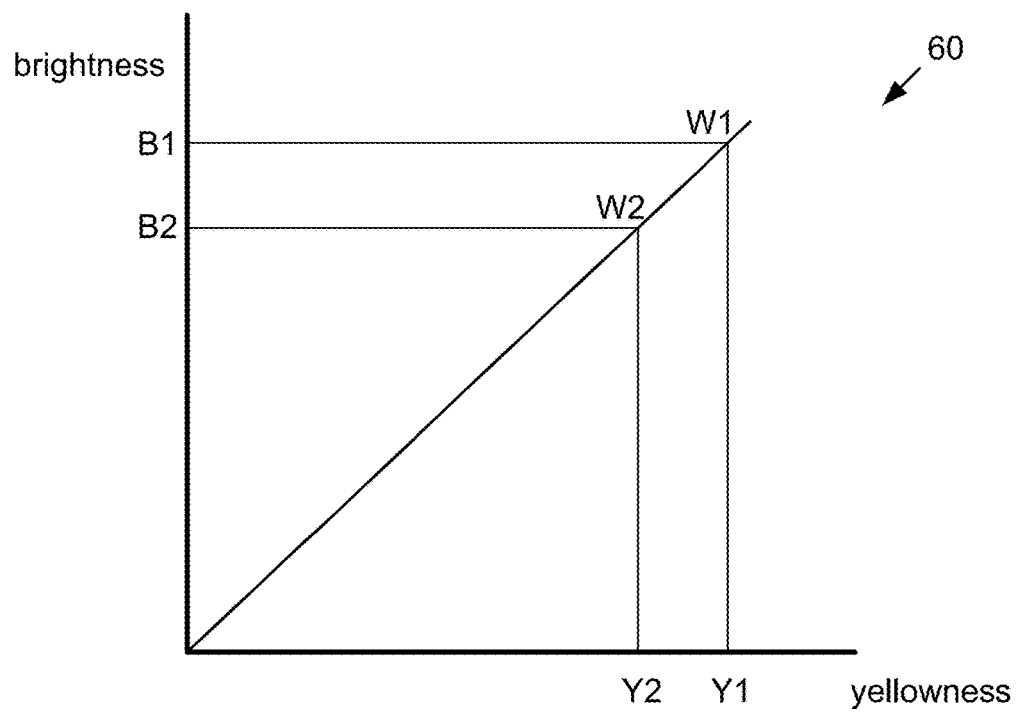
FIGS. 1E and 1F illustrate a characteristic of human visual processing.
Figure 1F:
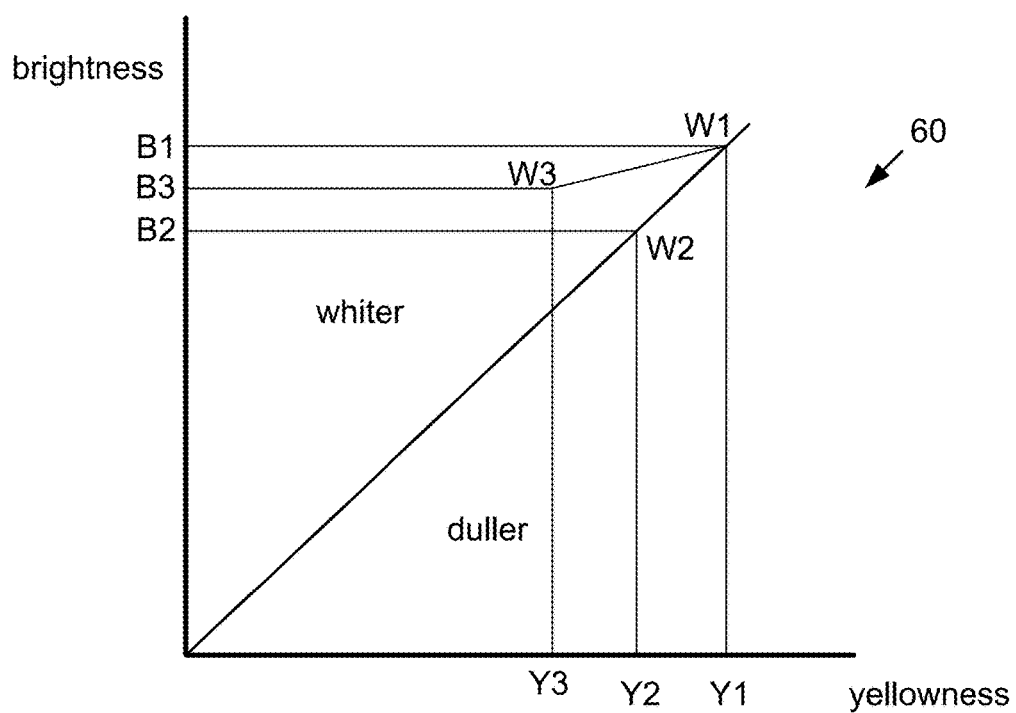

One visual processing mechanism leveraged by the present invention relates to a relationship between the brightness and the yellowness of a white color. Adding a very small amount of a blue (opposite to yellow) pigment to a white pigment causes the resulting color to appear more white to a human eye. Further, adding a blue pigment to a white pigment causes the lightness of a shade as well as the yellowness of the shade to decrease—but causes the resulting color to appear more white to the human eye. One example of this phenomenon: laundry detergents contain small quantities of blue or bluish-green pigment. Because of this pigment, white laundry appears to be whiter to a person (but the laundry may not be any cleaner). FIGS. 1E and 1F illustrate this characteristic of human visual processing.

FIG. 1E illustrates a chart 60 that demonstrates the relation between brightness and yellowness for human perception. A whiteness, W1, consists of a certain brightness B1 and a certain yellowness Y1. Whiteness refers to a human perception or preference rating for the color of white objects. A second whiteness, W2, consists of a second brightness B2 and a second yellowness Y2. W1 and W2 are on a straight-line of the relationship between brightness and yellowness. Human perception considers W1 and W2 to be a substantially equal white color—or relatively the same degree of whiteness.

FIG. 1F illustrates the effect of adding a very small amount of blue pigment to the whiteness, W1. After adding a very small amount of blue to W1, the following happens in human perception: the yellowness Y1 for W1 will decrease to a new yellowness Y3, while the brightness B1 for W1 will decrease to a new brightness B3. As a result, the new whiteness, W3, is not on the straight-line relationship between brightness and yellowness corresponding to W1 and W2. To human perception, W3 appears to be more white than W1 or W2.

In one embodiment, the present invention employs this characteristic of human visual processing to reduce power consumption. In this case, the present invention maintains a relatively higher amount of blue in altered white video information to increase whiteness the replacement white. To do so, RGB values are manipulated by adding a very small amount of a blue to a white shade. For example, White Smoke (245-245-245) may have its blue value increased (e.g., to 245-245-250) to increase whiteness perception of the altered white video information. This may reduce the perceived difference of a white alteration. Similarly, any white video information may be altered such that an increased proportion of blue is maintained in the altered white video information. For example, scalar quantities used to reduce RGB values for white information may include a smaller blue scalar quantity that red or green. In one embodiment, the altered blue value is greater after alteration than the altered red value and/or the altered green value in an RGB scheme. One of skill in the art will appreciate the vast number of combinations for colors and white shades in an RGB scheme that may benefit from this bluish enhancement.

Video information may also be altered based on power consumption characteristics of the display device. OLED devices include differential power consumption for red information, blue information and green information. In other words, some OLED devices consume different amounts of power based on color for each pixel—and thus different amounts of power based on color in the video information. Some conventional OLED devices consume less power for green optical elements. In this case, reducing red or blue information produces greater power conservation (red and blue cost more to display) that reducing green information. In this case, the present invention may use a shade of white that includes more green than red or blue to capitalize on power consumption differences between the colors.

In one embodiment, white video information alteration is immediate and continuous. In other words, white video alteration occurs immediately upon start up (or upon initiation using a graphics control as described below) and continues until the device is turned off or until or until the display or device is shut down after a certain period of inactivity according to a power conservation tool.

In a temporally varying embodiment, the present invention uses a threshold inactivity time to determine when alterations to white video information begin. The threshold inactivity time determines when power conservation begins. A user may set the threshold inactivity time via a graphics control such as that described in FIG. 4. Once the threshold inactivity time has been reached, white video information is altered to reduce power consumption.

Figure 2B:
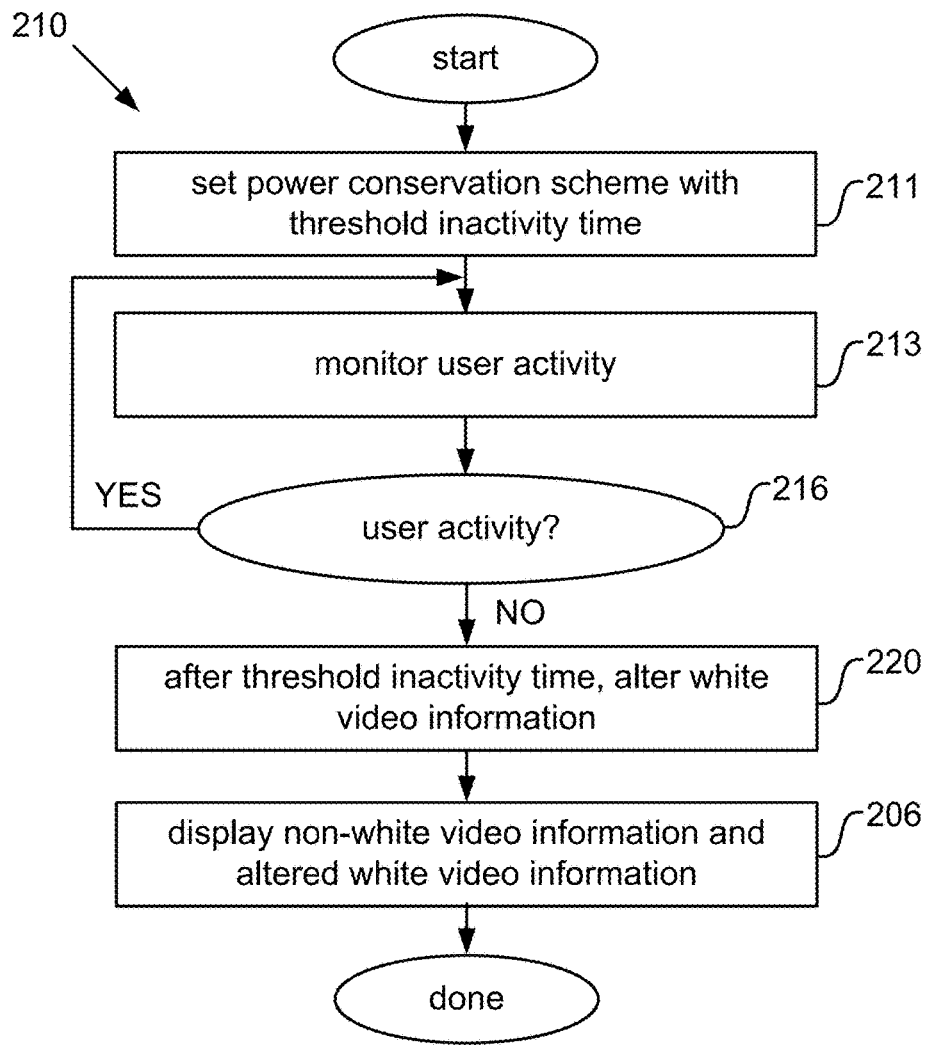
FIG. 2B illustrates a process flow for reducing power consumed by a display device in accordance with another embodiment of the invention.

FIG. 2B illustrates a process flow 210 for reducing power consumed by a display device in accordance with another embodiment of the invention. Process flow 210 begins by setting a power conservation scheme (211). A power scheme refers to a collection of power options that dictate how and when video information is altered to reduce display device power consumption. In one embodiment, a power conservation system is stored on a computer and implements a power conservation scheme without user input. In another embodiment, a graphics control, such as that described with respect to FIG. 4, allows a user to set a power scheme or one or more power options corresponding to techniques described herein, e.g., select a replacement white and a threshold inactivity time.

After the power conservation scheme has been established, process flow 200 monitors user activity within the display area (213). Process flow 210 continues to monitor activity over time and reacts according to any user activity or lack thereof (216). If user activity occurs in the display area, process flow 210 then resets the inactivity monitor clock and returns to 213. If user inactivity continues until the threshold inactivity time, then process flow 210 alters white video information in the entire display area according to a change determined in the power scheme for the threshold inactivity time (220). For example, all white video information in the entire display area may be replaced with a replacement white. In one embodiment, the present invention employs a threshold inactivity time from about 10 seconds to about 1 hour. In another embodiment, the present invention employs a threshold inactivity time from about 1 minute to about 10 minutes. Process flow 200 is not limited to any specific threshold inactivity time.

After the white video information is changed, the non-white video information and altered white video information are then simultaneously displayed (206).

In another temporally varying embodiment, alterations to white video information may occur at set power reduction intervals. The power reduction intervals determine specific regular times at which minor but additive video alterations are applied. For example, progressive and stepwise changes to RGB values of white video information may occur every ten seconds from RGB values of white information as it is initially presented to finally achieve RGB values for a replacement shade of white. In this case, the difference in RGB values from start to finish may be divided by the number of intervals to determine the amount of change at each interval. This allows the white video information to gradually change—and power conservation to gradually increase—over time and according to varying design or user preference. In addition, it also alters the video information without an appreciable single change that may be noticed by a person viewing the display.

Figure 2C:
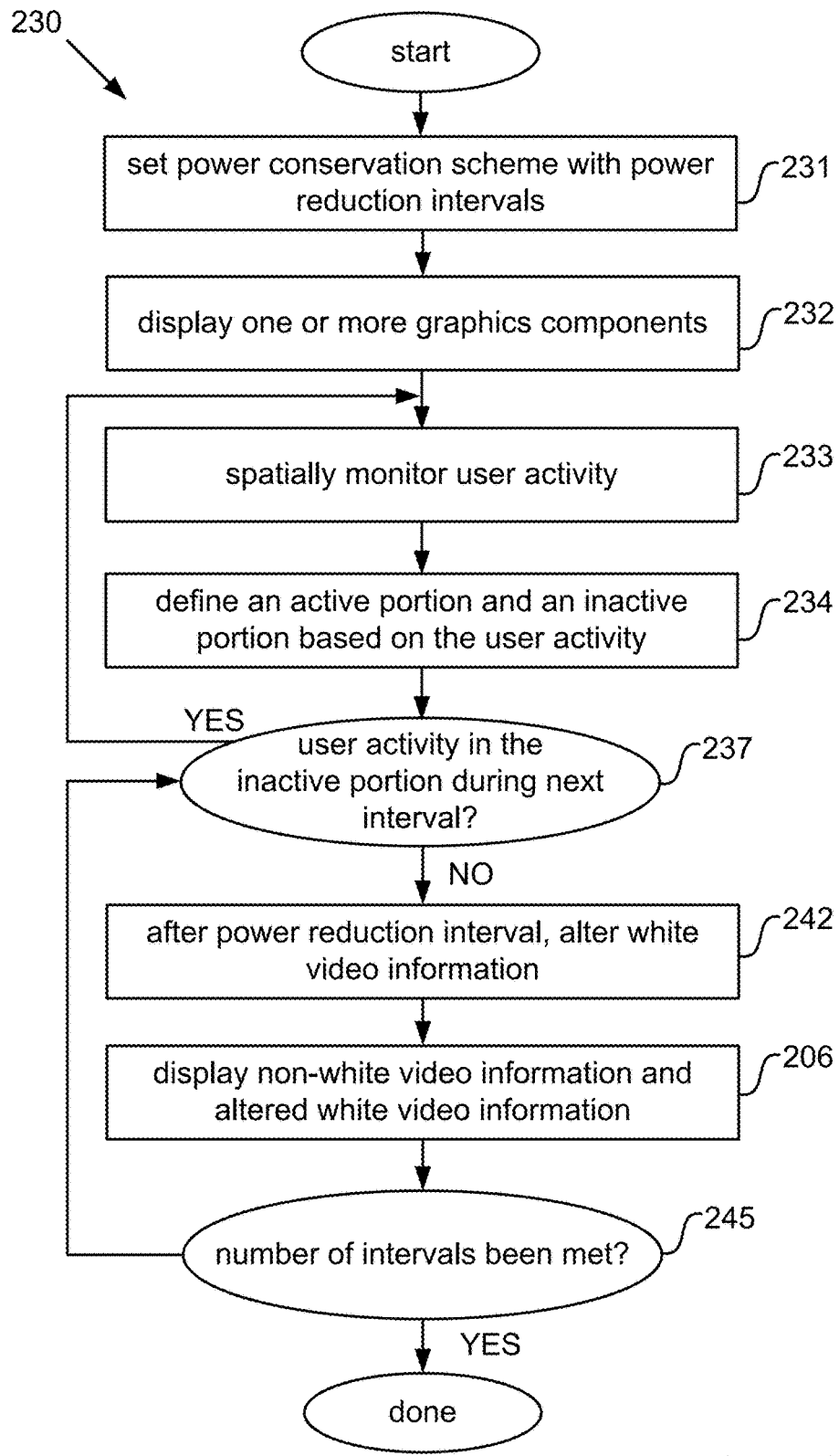
FIG. 2C illustrates a process flow for reducing power consumed by a display device in accordance with another embodiment of the invention.

FIG. 2C illustrates a process flow 230 for reducing power consumed by a display device in accordance with another embodiment of the invention. Process flow 230 begins by setting a power conservation scheme (231). For process flow 230, the power conservation scheme designates a power reduction interval at which white video information is altered.

In one embodiment, the present invention reduces power consumption based on usage distribution in a display area. In this case, the display area is divided into active and inactive portions. For example, a display area presented by a display device may be divided into three or four graphics components (including the background as one graphics component), each related to an individual program running on the computer. While one graphics component program—such as a word processing file—is active and used, white video information for the other inactive graphics components and inactive portions of the display area is altered to decrease power consumption for the inactive portions. In this active/inactive embodiment, white video information in the active portion or program is then left unaltered. The one or more graphics components are displayed (232).

Process flow 230 then spatially monitors user activity within the display area and graphics components (233). This comprises determining the location of user input and whether it is within the bounds of a graphics component. Based on the user input, process flow 230 defines an active portion and one or more inactive portions based on the user activity (234).

An active graphics component implies activity (or interaction) between the graphics component and a user, the nature of which will depend on the program or application associated with the graphics component. Activity may comprise a) user input within a perimeter or outer boundary for the graphics component (e.g., typing or positioning a pointer)—as determined by a program associated with the graphics component, and/or b) program output to the user—as determined by the program. The perimeter of an active graphics component also defines an active portion inside the perimeter and inactive portion(s) outside the perimeter for video alteration as described herein. Further description of spatial-based power conservation systems based on active and inactive portions is further described in commonly owned pending patent application Ser. No. 10/891,734 entitled "Spatial Based Power Savings", which is incorporated by reference herein in its entirety for all purposes.

Process flow 230 then monitors activity in the inactive portion over time to determine if user activity in the inactive portion continues (236). If user activity occurs in the inactive portion, process flow 210 then returns to spatially monitoring user activity (233) and defining a new active portion and new inactive portions based on the user activity (234). If no user activity occurs in the inactive portion for a power reduction interval, white video information in the inactive portion is altered such that the display device will consume less power when displaying the altered white video information (242). After the white video information is changed, the active graphics component and altered white video information are then simultaneously displayed (208).

According to process flow 230, alterations to white video information occur continue at set power reduction intervals (245, 237, 242, 208). The power reduction intervals determine specific times at which video alterations are applied. This allows the white video information to gradually change—and power conservation to gradually increase—over time. In order for a power reduction interval to be met, inactivity continues within the display area or an inactive graphics component or inactive portion for the duration of the next interval (237).

The gradual rate of video information alteration may be established according to power conservation system design or user preference, and advantageously allows inactive portions to alter without substantially noticeable stepwise changes. A magnitude for each incremental alteration may be determined by dividing a desired total alteration over a period of time by the number of intervals in the time period. For example, the stepwise changes may occur as often as desired to produce a total change over 3 minutes. Once the number of intervals has been reached, or the total alteration has been produced, then altering white video information at the power reduction intervals may stop (245 and done). For example, the white video information may finally produce a replacement shade of white described above, which is simultaneously displayed while displaying the unaltered non-white video information (206).

In one embodiment, a power reduction interval from several milliseconds to about 3 minutes is suitable for some graphics based user interfaces. In another embodiment, a power reduction interval from about 1 second to about 10 seconds is suitable. It is understood that power reduction intervals are a matter of system design and user choice and may be include different time periods that those specifically provided herein.

Altered white video information that was altered after a threshold inactivity time and/or power reduction interval returns—or reactivates—to its original state from an altered state after user activity in the inactive portion, or after some activity in the program designated as active by a power conservation program designer. Reactivation displays the video information as it was initially displayed before any alterations. In a specific embodiment, positioning a pointer in the display area or graphics component triggers reactivation and returns the display or graphics component to an initial state. Power conservation system designers may also customize reactivation rules and apply different conditions. Further description of threshold inactivity times and power reduction intervals is further described in commonly owned pending patent application Ser. No. 10/891,734 entitled "Spatial Based Power Savings", which was incorporated by reference above.

Although the process flow 210 was described above with respect to altering an entire display after a threshold inactivity time, and process flow 230 defined active and inactive portions for alteration at power reduction intervals, other combinations may be used. For example, white video information in inactive portions may be singly altered after a threshold inactivity time. Alternatively, white video information across the entire display area may be altered stepwise at power reduction intervals. Other temporal schemes are permissible. For example, temporally varying methods of the present invention may also shut down a computer system or display power after some predetermined time of user inactivity, e.g., 10 minutes, that applies a 'sleep' or 'hibernate' mode and turns off all video output for the entire display area.

Figure 3A:
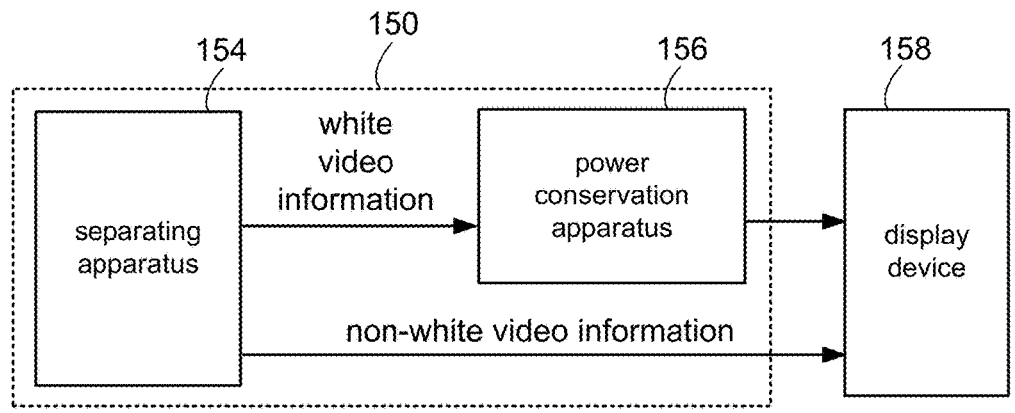
FIG. 3A illustrates a system for reducing power consumed by a display device in accordance with one embodiment of the present invention.

The present invention also relates to systems for conserving power for an electronics device or display device. FIG. 3A illustrates a system 150 for reducing power consumed by a display device 158 in accordance with one embodiment of the present invention. While the present invention will now be described as an apparatus composed of units, those skilled in the area will recognize that the present invention encompasses a method, process or software having as steps the actions performed by each unit and described below.

Power conservation system 150 comprises separating apparatus 154 and power conservation apparatus 156. In general, system 150 may comprise any combination of software and hardware for carrying out video processing and alterations as described herein. In one embodiment, separating apparatus 154 and power conservation apparatus 156 are implemented solely in software stored on a computer and run by a processor (such as a video or graphics chip or main processor). In another embodiment, general-purpose computer processing units, instead of dedicated hardware, implement power conservation techniques described herein.

Separating apparatus 154 is designed or configured to parse video information for display on display device 158 and designate the video information as a) white video information or b) non-white video information. In one embodiment, separating apparatus 154 differentiates white video information from non-white video information using a white threshold. Several suitable white threshold and differentiation techniques were described above. On one or more output lines, separating apparatus 154 outputs: a) white video information portions of a display area, and b) non-white video information portions of the display area. For example, white and non-white portions may be identified by pixel locations in the display area—on a pixel by pixel basis.

Power conservation apparatus 156 is designed or configured to receive white video information identified by separating apparatus 154, and to alter white video information such that display device 158 will consume less power when displaying the altered white video information. Several techniques that reduce power consumption for display device 158 for white video information alterations were discussed above. Power conservation apparatus 156 outputs the altered video information to display device 158. While apparatus 156 has been described as a discrete apparatus, those skilled in the art will realize that apparatus 156 may include software that generates a control signal useful for altering video information.

Display device 158 outputs video information. In one embodiment, display device 158 outputs video information onto a screen comprising an array of pixels where each pixel is enumerated for addressing by video information. Display device 158 receives the altered white video information from power conservation apparatus 56—or a buffer included in or associated with apparatus 156—and displays the altered white video information simultaneously with the non-white video information. Based on output from separating apparatus 154, a display area for device 158 is divided into altered white portions and unaltered non-white portions. The separation may occur on a pixel by pixel basis according to: a) the video information and b) a particular white threshold applied to the video information.

Display device 158 varies its power consumption with video output. In one embodiment, display device 158 varies power consumption with the spatial distribution of light output in a display area. One such display device 158 employs organic light emitting diodes (OLED) for video output. OLED displays are current driven devices where the intensity of light output from an OLED display is proportional to electrical current. Power output for an OLED device spatially varies by controlling and modulating electrical current levels for individual light elements that are arranged for each pixel. For a color display, each pixel usually comprises three OLED light element assemblies: one for red light, a second for blue light, a third for green light. Each assembly produces a color of light directly or uses a colored filter, and RGB values are produced according to current input proportional to an RGB value, such as from 0 to 255 or normalized in a range from 0 to 1. Reducing RGB values for individual pixels—such as reducing RGB values for altered white video information as described herein—reduces power consumption for each assembly and each pixel. Cumulatively, this reduces current and power requirements for the entire OLED display device based on summations of all pixels whose power has been reduced. OLED displays are becoming increasingly popular for portable and battery powered devices, making power conservation techniques described herein particularly useful to conserve power when supply is limited.

In another embodiment, display device 158 comprises a backlit LCD screen. For many LCD display devices, LCD screen power consumption is proportional to luminance for the screen and the display device comprises a set of stepwise luminance levels (e.g., from 1-10) that each increasingly output more light and consume more power. LCD displays for many handheld devices include less than ten stepwise luminance levels, while LCD displays for many laptop computers include more than ten stepwise luminance levels. Individual colors for an LCD display are attained by controlling red, green and blue transmittance elements for each pixel according to RGB based video information. In this case, power conservation is attained by reducing backlit luminance for the entire screen while increasing transmittance for altered white video information at the reduced backlit luminance level and scaling transmittance of other colors to the new reduced backlit luminance. The altered white video information sets a new maximum for transmittance/backlit luminance in the display area and reducing the maximum transmittance (assuming the new white will need the highest transmittance for all video information) permits a lower stepwise luminance level to be used—thereby saving power. For example, the stepwise luminance levels may be reduced by one level from its current position since the altered white video information only comprises 90% of the maximum luminance. In one embodiment, all other colors and video information are scaled in transmittance based on the new stepwise luminance level in order maintain their previous color with as little perceivable change as possible.

The present invention is independent of any particular display device, any mechanism of light generation for a display device, or any power consumption scheme for a display device, and only assumes that power consumption for display device 158 may vary with video information. In a specific embodiment, display device 158 can vary power consumption spatially.

Figure 3B:
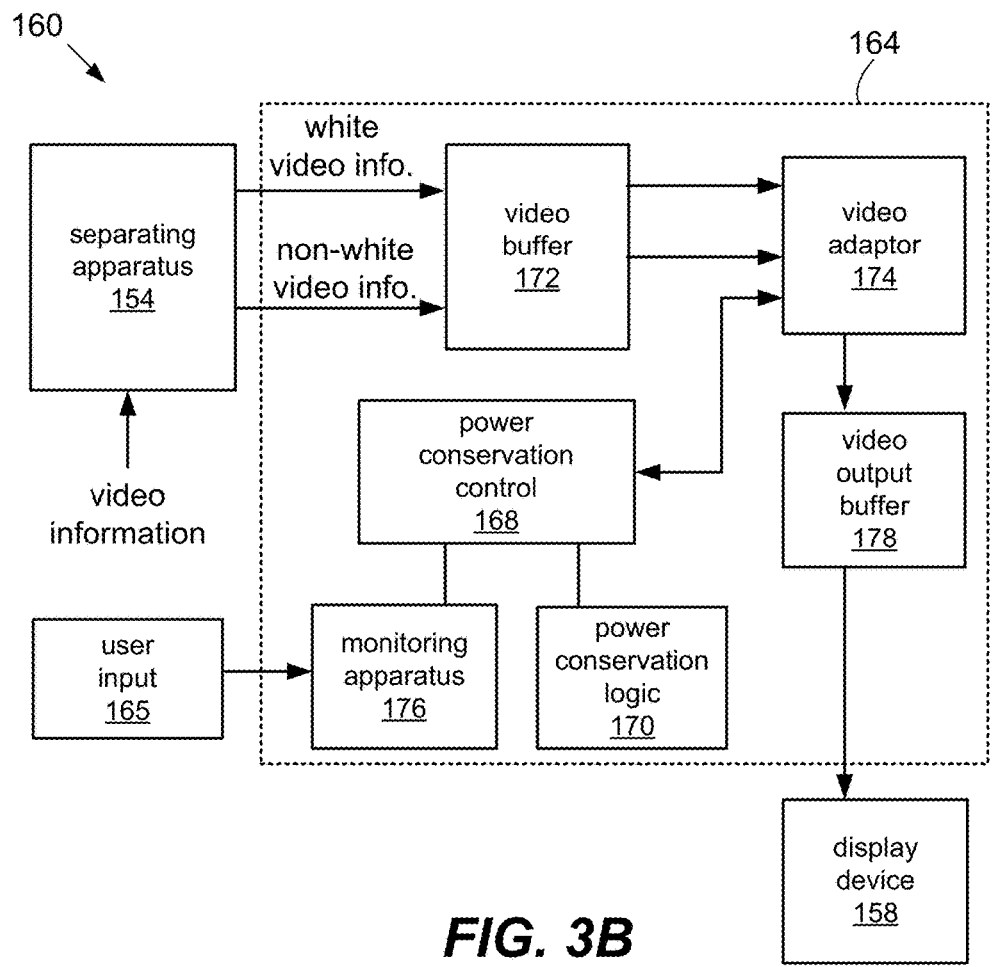
FIG. 3B illustrates a system for reducing power consumed by a display device in accordance with a specific embodiment of the present invention.

FIG. 3B illustrates a system 160 for reducing power consumed by a display device 158 in accordance with another embodiment of the present invention. System 160 comprises video information separating apparatus 164 and power conservation apparatus 166. Display device 158 was described above. User input 165 refers to information provided by a user, e.g., via a mouse and graphical user interface or graphics control.

Separating apparatus 154 receives video information and identifies white video information in the received video information. In one embodiment, separating apparatus 154 applies a white threshold to all video information for display on device 158 on a pixel by pixel basis to identify the white video information. In one embodiment, separating apparatus 154 may access memory that stores instructions for identifying white video information, such as a white threshold applied in separating the video information.

Power conservation apparatus 166 alters white video information such that a display device will consume less power. Power conservation apparatus 166 comprises power conservation control 168, power conservation logic 170, at least one video buffer 172, video adaptor 174, monitoring apparatus 176, and at least one output video buffer 178. Each of the components for system 160 may be implemented in hardware, firmware or software, or a combination thereof.

Video buffer 172 couples to an output of separating apparatus 154 and stores video information. More specifically, video buffer 172 stores white video information and non-white video information as delineated by separating apparatus 154. The white and non-white video information is stored in buffer 172 without any alterations to reduce power consumption. Although video buffer 172 is illustrated as a single unit, is understood that buffer systems may employ multiple storage components. In particular, a different buffer may be used to store white video information than a buffer used to store non-white video information. One or more RAM memory components are suitable for use as video buffer 72.

Power control logic 170 stores data and instructions that allow a processor or video adaptor to implement power conservation techniques described herein. For example, power control logic 170 may include nonvolatile memory that stores thresholds and replacement whites for defining white. In one embodiment, the logic stores instructions that allow the user to set a threshold white amongst a range of possible values. In another embodiment, logic 170 stores power conservation instructions that are implemented by design with no user input. Logic 170 may also store instructions that convert pixel values between color schemes if needed. Power control logic 170 may also store instructions for separating apparatus 154 and video adaptor 174 to implement power conservation techniques as described herein.

Monitoring apparatus 176 tracks user activity in a display area. Monitoring apparatus 176 includes an output that provides a signal including user activity information. Monitoring apparatus 54 may also provide temporal information with regard to user activity by referencing user activity against temporal data received from a clock source. In some cases, monitoring apparatus 176 a) tracks user activity according to one or more programs that provide visual output on the display area and b) provides an indication of which programs are currently being used (and label the program as 'active') and those programs currently unused ('inactive').

Power conservation control 168 determines how white video information is altered to reduce power. In one embodiment, power conservation control 168 includes an input from power conservation logic 170 that receives stored instructions related to power conservation techniques described herein. In this case, power conservation control 168 determines an alteration to video information according to stored instructions from power conservation logic 170, and outputs a signal indicative of the alteration. For example, control 168 may implement a replacement white for white information where the replacement white has been selected from a list of white shades stored in logic 170 and output RGB values for the replacement white. The replacement white is then sent to video adaptor 174 where white information identified by separating apparatus is marked for alteration and replaced by the replacement white. Alternatively, RGB values for all white information that passes a threshold may each be reduced by a scalar quantity as determined by stored instructions from power conservation logic 170.

In another embodiment, power conservation control 168 includes an input that receives user activity information from monitoring apparatus 176 and an input from power conservation logic 170. In this case, control 168 coordinates input from monitoring apparatus 176 and power conservation logic 170. Based on user activity in a program or portion of the display as indicated by monitoring apparatus 176, control 168 outputs a signal for inactive portions of the display and a signal for the replacement white. Alternatively, based on user activity within the entire display area, monitoring apparatus may send a signal to power conservation control 168 to alter white video information when some predetermined condition has been met. For example, monitoring apparatus may send a signal to power conservation control 168 to alter white video information after a predetermined time of inactivity in the display has elapsed. White information identified by separating apparatus and identified according to a criteria from monitoring apparatus 176 is then marked for alteration in video adaptor 174. While two examples of power conservation control 168 have been described, other configurations for power conservation control 168 are suitable for use with the present invention.

For some systems such as handheld computers, power conservation control 168 alters video information and does not send power conservation signals to a separate processor or structure that performs video alterations as described herein.

In another embodiment, power conservation control 168 does not alter video information and relies on outside source to do so. In the illustrated system, power conservation apparatus 166 includes a video adaptor 174 that receives signals produced by power conservation control 168 and alters white video information based on the signals. Video adaptor 174 creates a set of signals that display pixelated video information. Video adaptor 174 may correspond to a graphics controller, graphics co-processor, graphics accelerator, or other video controller that is commercially available from a variety of vendors. Such controllers are often available as cards that include a separate circuit board with memory and a dedicated processor. Video adaptors 174 are commonly implemented within desktop or laptop computer systems. An output line of video adaptor 174 provides the altered white video data. In one embodiment, video adaptor 74 converts digital information to analog information. In another embodiment, the data remains in a digital format when provided to the video display.

Output video buffer 178 is configured to receive the altered white video information from an output line of video adaptor 174 and may receive unaltered non-white video information as stored in video buffer 172. Output video buffer 178 is configured or designed to output, to display device 158, a) altered white video information for display in the white video portions of a display area, and b) the unaltered non-white video information for display in the non-white portions. Display device 158 displays a) and b) simultaneously. Although output video buffer 178 is illustrated as a single unit, is understood that buffer systems may employ multiple discrete storage components. In addition, although video buffer 178 and video buffer 172 are shown as separate units, it is understood that they may be combined in a common unit. Alternatively, system 160 may not include a separate output buffer and temporary storage may occur using on-chip data storage on video adaptor 174.

In one embodiment, white power conservation as described herein is implemented without user control. In another embodiment, A computer system provides a user the ability to turn on/off white power conservation or tailor the white power conservation to personal preferences.

Figure 4:
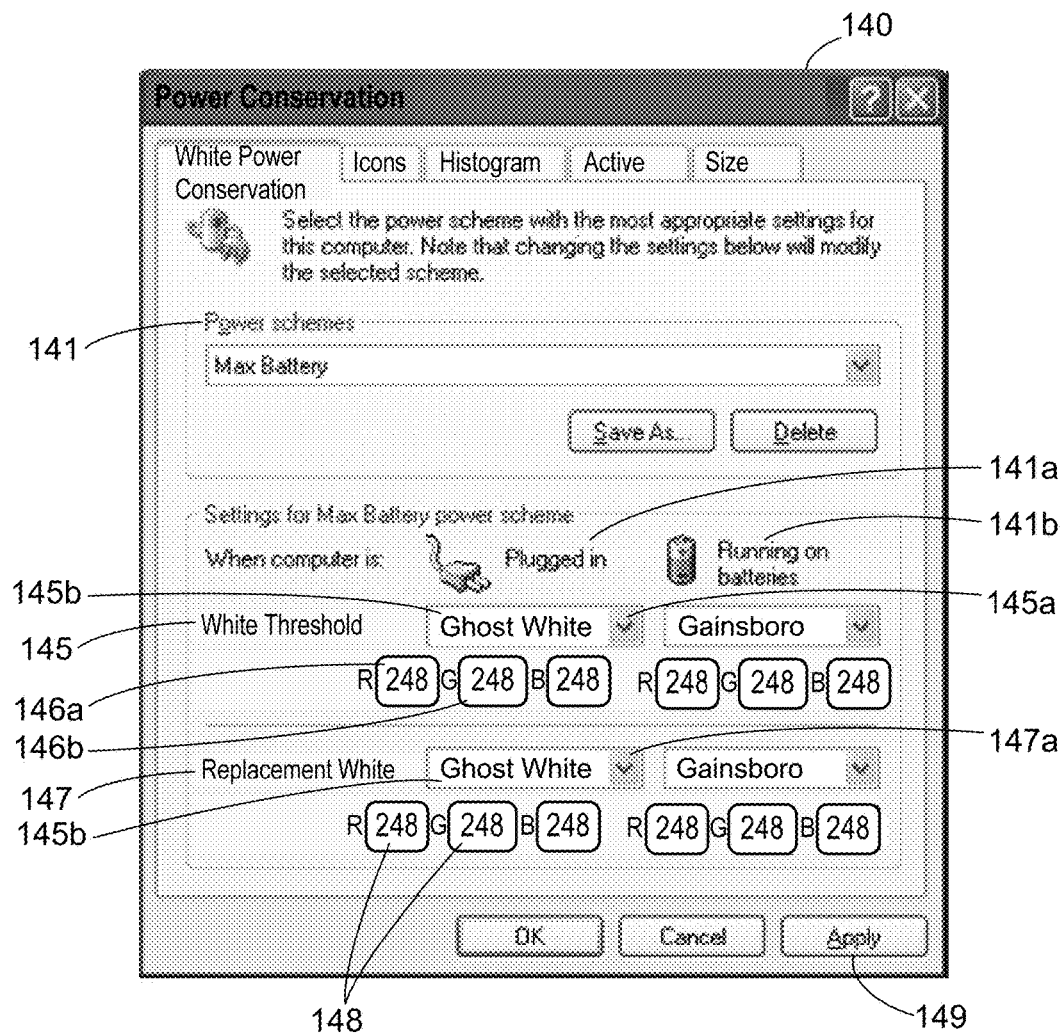
FIG. 4 illustrates a power conservation graphics control for applying power conservation techniques described herein in accordance with one embodiment of the present invention.

In one aspect, present invention also relates to controls for implementing power conservation. Graphics-based user interfaces employ what are referred to as graphics "controls". A graphics control is a discrete video object, for display by a display device, which can be manipulated by a user to alter one or more graphics outputs or effects and/or to initiate an action in an associated application program. The graphics control often includes its own bitmap comprising an array of pixel values. FIG. 4 illustrates a power conservation graphics control 140 for applying power conservation techniques described herein in accordance with one embodiment of the present invention.

Power conservation graphics control 140 facilitates interface between a user and a program run on a computer that allows the user to alter power consumption for a display device which outputs video information for the computer. Specifically, graphics control 140 allows the user to alter video information output by a display device to reduce power consumption.

Power conservation graphics control 140 comprises a number of power conservation control tools 142-149 that allow a user to set one or more parameters for a power conservation program that alters white video information. The power conservation control tools 142-149 have text labels that, along with their pictorial representations, describe their function.

In one embodiment, power conservation graphics control 140 allows a user to set one or more power schemes 141. A power scheme refers to a predefined collection of power options, and simplifies usage by allowing the user to apply multiple parameters with a single choice and action. Two power schemes are shown for graphics control 140: 'plugged in' scheme 141a and 'battery use' scheme 141b. Other exemplary power schemes include Max Battery (aggressive power conservation for battery power conservation), laptop use and PDA use (depending on the system operating graphics control 140). Selecting a power scheme 141 initiates one or more power options for the scheme. A user may apply a power scheme as is. Alternatively, graphics control 140 allows a user to tailor and apply customized settings by using a pre-existing power scheme 141 as a starting point for customization. Graphics control 140 thus allows a user to customize video alteration response for different power states of the computer, operation states for the computer system, different display devices, and different graphics components.

A threshold white tool 145 allows a user to set a threshold white that determines what video information is considered white and altered. A scroll button 145a allows a user to select a threshold white shade from a stored set of white shades. Several white shades were discussed above, and others may be used. Selecting a particular threshold white produces RGB values 146 for the white shade in window 145b. Windows for each RGB value 146 also allow a user to manually alter and customize the threshold white shade produced using scroll button 145a. For example, the user may increase the red level to further conserve power for red information. The graphics-based user interface interprets this input as an instruction from the user, and adapts power conservation control according to the input.

A replacement white tool 147 for each power scheme 141 allows a user to manually set a replacement white that designates what the altered white video information will appear as. In a specific embodiment, replacement white tool 147 initially appears as the same shade of white and RGB values as a shade of white selected using threshold white tool 145. A scroll button 147a allows a user to select a replacement white shade—different from the threshold white—from a stored set of white shades. Selecting a particular replacement white produces RGB values 148 for the replacement white in window 147b. Windows for each replacement RGB value 148 also allow a user to alter and customize the replacement white produced using scroll button 147a. For example, the user may increase blue levels to attain a more personally pleasing shade of white with more blue. The graphics-based user interface interprets this input as an instruction from the user, and adapts power conservation control according to the input.

An apply button 149 allows a user to initiate changes made within graphics control 140 onto the display device and graphics-based user interface. Thus, after specific changes and power conservation parameters are selected and set, the user may click apply button 149 to initiate the changes.

In addition to the specific tools described above, power conservation tools for graphics control 140 may include other conventional graphics control tools such as buttons, options, scroll bars, pictures, spin dials, list boxes, text boxes, etc. For example, a check box is a control tool that comprises an empty box. When a user selects the box, it is filled with an "X" or other suitable information to indicate that the user has selected an option corresponding to the box. One or more check boxes may be used, for example, to set the replacement white equal the white threshold shade. Graphics control 140 also includes a 'cancel' button that closes graphics control window 140 without initiating any changes, and an 'OK' button that closes graphics control window 140 and applies any changes as described above. While the graphics control 140 is shown in one embodiment suitable for use with a laptop or desktop computer, graphics control 140 may take other forms. For example, a graphics control 140 designed for use with a handheld computer may include less options and sophistication to complement the reduced screen space of the handheld computer.

Although the present invention has been described so far with respect to alterations in white video information and power conservation according to a RGB color scheme, white video information alterations may also be applied in other color schemes, as one of skill in the art will appreciate. An HSL color scheme characterizes video output according to a wavelength or color (hue), degree of purity of the color—or degree of separation from gray having the same color (saturation), and degree of brightness for the color ranging from black to white (luminance). Cyan, magenta, yellow and black (CMYK) is another color scheme regularly used to characterize video output from display device according to combinations of cyan, magenta, yellow and black values. In general, white-based power conservation techniques described herein may be implemented via regardless of the color scheme used to store the video information or employed by a graphics-based user interface, video controller or display device. Alterations and video conservation as described herein may also apply to black and white video output.

Translation between the color schemes is well known to one of skill in the art. Although the present invention has been described so far with respect to white video information alterations an RGB scheme, one of skill in the art will appreciate that power conservation techniques described herein may be programmed or stored according to one color scheme, and output according to another color scheme for the display device. For example, video data manipulation techniques described herein may be programmed or stored in an HSL scheme, and then converted to and implemented on an RGB based display device, or vice versa. Many output devices employ an RGB color scheme for video output. These display devices may include a red, green, and blue optical modulation element for each pixel, such as individual RGB light emitting diode emitters for an OLED display device.

Figure 5:
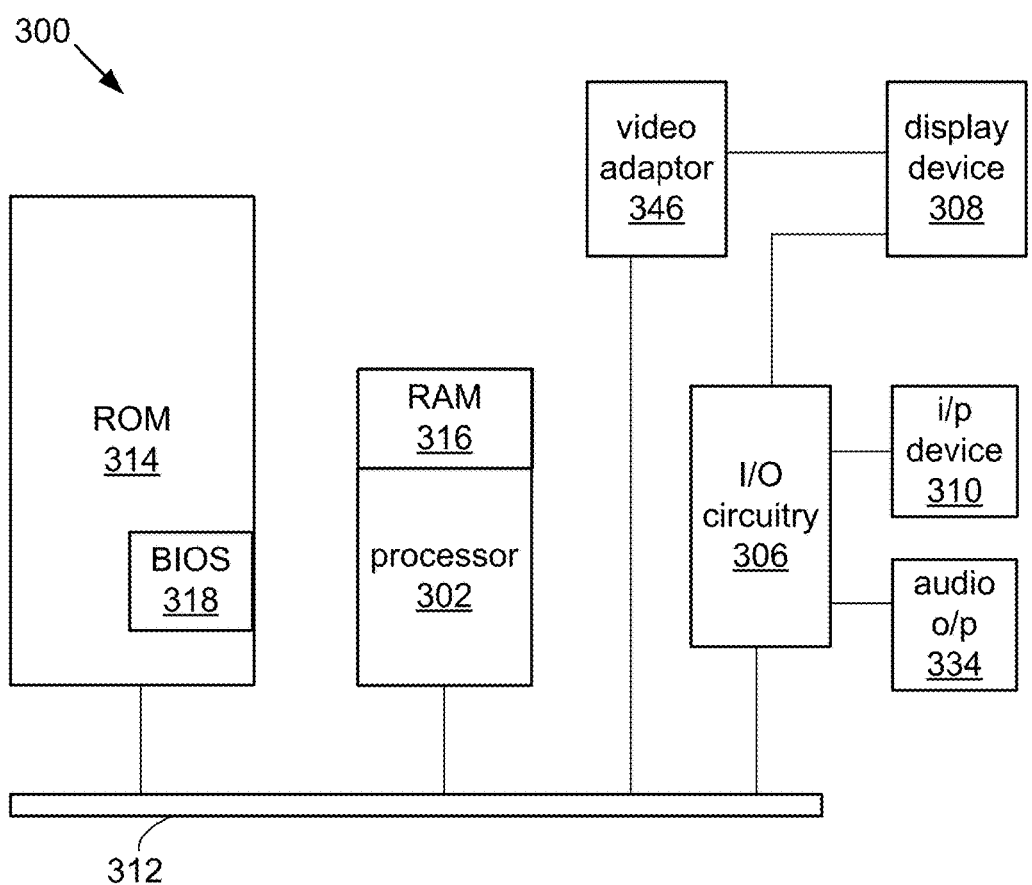
FIG. 5 illustrates an exemplary computer system suitable for implementing the invention.

The present invention finds use with computer systems such as desktop and laptop computers, personal digital assistants (PDAs), cellular telephones, digital cameras, portable computer systems, and the like. FIG. 5 schematically illustrates an exemplary general-purpose computer system 300 suitable for implementing the present invention.

Computer system 300 comprises a processor, or CPU, 302, one or more memories 314 and 316, input/output (I/O) circuitry 306, display device 308, input device 310, and system bus 312. System bus 312 permits digital communication between system processor 302 and ROM 314, as well as permits communication between other components within system 300 and processor 302 and/or ROM 314.

System 300 memory includes read only memory (ROM) 314 and random access memory (RAM) 316. Other memories may be included. ROM 314 stores a basic input/output system 318 (BIOS), containing basic routines that help to transfer information between elements within computer system 300, such as during start-up. Computer system 300 may also include a hard disk drive and an optical disk drive, for example. The optical disk drive reads from and may write to a CD-ROM disk or other optical media. The drives and their associated computer-readable media provide nonvolatile storage for system 300. A number of program modules may be stored in the drives, ROM 314, and/or RAM 316, including an operating system, one or more application programs, other program modules, and program data. Although data storage above refers to a hard disk and optical disk, those skilled in the art will appreciate that other types of storage are suitable for use with a computer system, such as magnetic cassettes, flash memory cards, USB memory sticks, and the like. In addition, not all computer systems, such as PDAs and other portable devices may include multiple external memory options.

Processor 302 is a commercially available microprocessor such as one of the Intel or Motorola family of chips, or another suitable commercially available processor. Processor 302 digitally communicates with ROM 314 via system bus 312, which may comprise a data bus, control bus, and address bus for communication between processor 302 and memory 314. CPU 302 is also coupled to the I/O circuitry 306 by system bus 312 to permit data transfers with peripheral devices.

I/O circuitry 306 provides an interface between CPU 302 and such peripheral devices as display device 308, input device 310, audio output 334 and/or any other I/O device. For example, a mouse used as input device 310 may digitally communicate with processor 302 through a serial port 306 that is coupled to system bus 312. Other interfaces, such as a game port, a universal serial bus (USB) or fire wire, may also provide digital communication between a peripheral device and processor 302. I/O circuitry 306 may also include latches, registers and direct memory access (DMA) controllers employed for interface with peripheral and other devices. Audio output 334 may comprise one or more speakers employed by a headphone or speaker system.

Display device 308 outputs video information—both unaltered and altered—including graphics components, backgrounds, graphics controls such as those described herein, graphics-based user interfaces, and other visual representations of data. For example, display device 308 may comprise a cathode ray tube (CRT), liquid crystal display (LCD), organic light emitting diode (OLED), or plasma display, of the types commercially available from a variety of manufacturers. Display device 308 may also comprise one or more optical modulation devices, or the like, used in projecting an image. Projection display devices that project an image onto a receiving surface are becoming more popular, less expensive, more compact; and may employ one or more optical modulation technologies as well as a wide variety of individual designs. Common optical modulation devices include those employing liquid crystal display (LCD) technology and digital mirror device (DMD) technology. When used as a display device for a computer, these projection devices provide the potential for a much larger image size and user interface.

Display device 308 may also digitally communicate with system bus 306 via a separate video interface, such as a video adapter 346. Video adapter 346 may be responsible for assisting processor 302 with video graphics processing including power conservation alterations described herein. Video adapter 346 may be a separate graphics card or graphics processor available from a variety of vendors that are well known in the art.

Input device 310 allows a user to enter commands and information into the computer system 300, and may comprise a keyboard, a mouse, a position-sensing pad on a laptop computer, a stylus working in cooperation with a position-sensing display on a PDA, or the like. Other input devices may include a remote control (for a projector), microphone, joystick, game pad, scanner, or the like. As used herein, input device refers to any mechanism or device for entering data and/or pointing to a particular location on an image of a computer display. Input as described herein may also come through intermediary devices. For example, a remote control may communicate directly with processor 302, or through an intermediary processor included in another device such as a hybrid entertainment device such as a set-top box or projector. The user may then input information to computer system 300 using an infrared remote control device that communicates first with the intermediary device, and then to processor 302.

In one embodiment, a graphics-based user interface implemented by computer system 300 displays a graphics control such as control 140 described above. To display a power conservation graphics control, processor 302 issues an appropriate command, followed by an identification of data that is to be used to construct the graphics control. Such data may include a number of power conservation control tools that allow a user to change how video data is altered. ROM 314 also stores a number power conservation commands and instructions for implementing the techniques described herein. In one embodiment, the present invention is practiced in the context of an application program that runs on an operating system implemented by computer system 300 or in combination with other program modules on computer system 300.

The present invention may be implemented on a range of computer systems. In addition to personal computers such as desktop computers and laptop computers, a variety of other computer systems and computer devices employing a digital processor, memory and a display device may implement the present invention. Handheld computers and other small portable digital devices such as cell phones and digital cameras are increasingly integrating video display and computer functionality. One current trend is hybrid entertainment devices that integrate the functionality of computer systems, audio devices, and televisions. Any of these devices may employ and benefit from the power conservation methods and systems described herein. The scope of digital computer systems is expanding hurriedly and creating new devices that may employ the present invention. In general, any digital device employing an output display device that varies output power with video content may benefit from the present invention. Moreover, those skilled in the art will appreciate that the invention may be practiced with other computer system configurations, multiple display device systems, multi-processor systems, microprocessor-based or programmable consumer electronics, minicomputers, mainframe computers, and the like.

In some cases, control menus and toggles, a clock, and other small and frequently used graphics components may include video information that is not altered while white video information for the background and all programs is altered to conserve power. Since these small graphics components may occupy a relatively minor percentage of the display area for a computer device, avoiding power conservation for these smaller elements does not contribute significantly to power consumption and maintains a person's ability to detect and use these elements without any alteration.

The present invention is particularly useful to portable computing devices run with battery power. Most handheld devices are designed to rely on battery power. In addition, although the present invention has been discussed with respect to reduced power consumption, energy and power are relatively interchangeable in a discussion of the benefits of conservation.

Embodiments of the present invention further relate to computer readable media that include program instructions for performing power conservation techniques described herein. The media and program instructions may be those specially designed and constructed for the purposes of the present invention, or any kind well known and available to those having skill in the computer software arts. Examples of computer-readable media include, but are not limited to, magnetic media such as hard disks, semiconductor memory, optical media such as CD-ROM disks; magneto-optical media such as optical disks; and hardware devices that are specially configured to store program instructions, such as read-only memory devices (ROM), flash memory devices, EEPROMs, EPROMs, etc. and random access memory (RAM). Examples of program instructions include both machine code, such as produced by a compiler, and files containing higher level code that may be executed by the computer using an interpreter.

Graphics controls and graphics-based user interfaces such as those described herein may be implemented using a number of computer languages and in a number of programming environments. One suitable language is Java, available from Sun Microsystems of Sunnyvale, Calif. Another suitable programming environment is the Microsoft Windows® programming environment, which provides a series of operating systems suitable for implementing the present invention both on laptop computers and handheld computers.

Although the foregoing invention has been described in some detail for purposes of clarity of understanding, those skilled in the art will recognize that various modifications may be made within the scope of the appended claims. The invention is, therefore, not limited to the specific features and embodiments described herein and claimed in any of its forms or modifications within the scope of the appended claims.

What is claimed is:

1. A method for reducing power consumed by an electronics device that includes a display device, the method comprising:

identifying white video information included in video information for display on the display device;

altering, without user input, the white video information such that the display device will consume less power when displaying the altered white video information than an amount of power that would be required to display the white video information without the alteration, according to a white threshold such that white video information having a color value above the white threshold is reduced to a color value below the white threshold; and displaying the altered white video information with non-white video information included in the video information for display that was not identified as the white video information, wherein the altered white video information is different than the white threshold.

2. The method of claim 1 wherein identifying the video information comprises applying the white threshold to the video information.

3. The method of claim 2 wherein the video information is represented according to an RGB scheme and the white threshold comprises a red threshold, a blue threshold, and a green threshold.

4. The method of claim 3 wherein the red threshold, the blue threshold, and the green threshold are different.

5. The method of claim 4 wherein the replacement white comprises a red value greater than 220, a blue value greater than 230, and a green value greater than 220.

6. The method of claim 1 wherein altering the white video information comprises replacing the white video information with a replacement white.

7. The method of claim 6 wherein the replacement white includes a predetermined shade of white.

8. The method of claim 1 wherein the altered white video information is represented according to an RGB scheme and the altered white video information comprises an altered red value, an altered blue value, and an altered green value and the altered blue value is greater than the altered red value and greater than the altered green value.

9. The method of claim 8 wherein the altered blue value is greater than 240.

10. The method of claim 1 wherein the display device is an OLED device.

11. The method of claim 1 wherein the display device is included in one of a laptop computer, a handheld computer, a portable phone or a portable music player.

12. A method for reducing power consumed by an electronics device that includes a display device, the method comprising:
  identifying white video information included in video information for display on the display device;
  altering, without user input, the white video information such that the display device will consume less power when displaying the altered white video information than an amount of power that would be required to display the white video information without the alteration, according to a white threshold such that white video information having a color value above the white threshold is reduced to a color value below the white threshold,
  wherein the altered white video information is represented according to an RGB scheme and the altered white video information comprises an altered red value, an altered blue value, an altered green value, and the altered blue value is greater than the altered red value or the altered green value; and simultaneously displaying the altered white video information with non-white video information included in the video information for display that was not identified as the white video information, and
  wherein the altered white video information is different from the white threshold.

13. The method of claim 12 wherein identifying the video information comprises applying the white threshold to the video information.

14. The method of claim 12 wherein the altered blue value is greater than 240.

15. A non-transitory computer readable medium including instructions for reducing power consumed by an electronics device that includes a display device, the computer-readable medium comprising:
  instructions for identifying white video information included in video information for display on the display device;
  instructions for altering the white video information such that the display device will consume less power when displaying the altered white video information than an amount of power that would be required to display the white video information without the alteration, according to a white threshold such that white video information having a color value above the white threshold is reduced to a color value below the white threshold; and
  instructions for displaying the altered white video information with non-white video information included in the video information for display that was not identified as the white video information, and
  wherein the altered white video information is different from the white threshold.

16. The computer readable medium of claim 15 further comprising instructions for applying the white threshold to the video information.

17. The computer readable medium of claim 15 wherein altering the white video information comprises replacing the white video information with a replacement white.

18. The computer readable medium of claim 17 wherein the replacement white comprises a red value greater than 220, a blue value greater than 230, and a green value greater than 220.

19. The computer readable medium of claim 15 wherein the altered white video information is represented according to an RGB scheme and the altered white video information comprises an altered red value, an altered blue value, and an altered green value and the altered blue value is greater than the altered red value and greater than the altered green value.

20. The computer readable medium of claim 15 wherein the display device is an OLED device.

* * * * *